July 27, 1937.　　　M. A. KENNEDY　　　2,087,979
FRUIT JUICE EXTRACTOR
Filed May 7, 1935
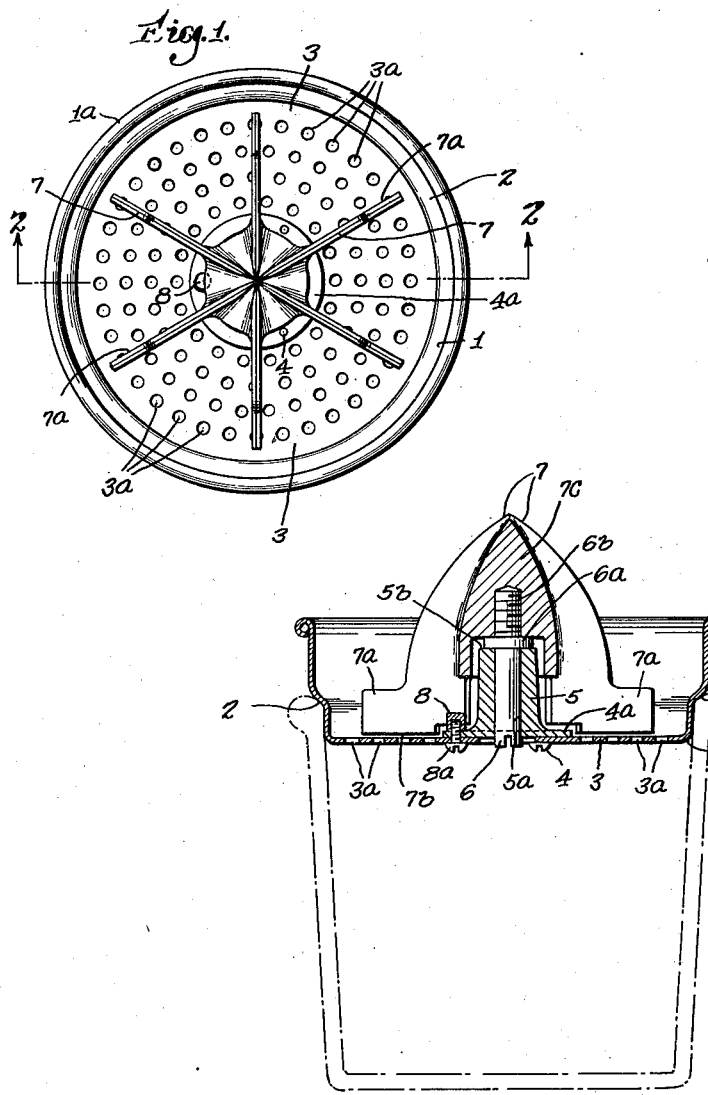
Inventor
M. A. Kennedy
by
Geo. N. Goddard Attorney Patented July 27, 1937

2,087,979

UNITED STATES PATENT OFFICE 2,087,979

FRUIT JUICE EXTRACTOR

Michael A. Kennedy, Los Angeles, Calif.

Application May 7, 1935, Serial No. 20,124

2 Claims. (Cl. 146—3)

This invention relates to juice extractors used for the purpose of extracting juice particularly from citrus fruits, such as oranges, lemons, grape fruit, etc. and is intended to provide a construction and arrangement of juicer that will be capable of more easily and efficiently extracting the pulp and juice from a half section of the orange and at the same time eliminate the objectionable clogging of the strainer by rapid accumulation of pulp which requires very frequent removal to keep the strainer openings free.

In general the invention comprises a receptacle having a peripheral wall and a foraminous strainer bottom combined with a reamer having radiating reamer blades and having bearing support on a central portion of the strainer to permit rotative movement of the reamer, the blades of the reamer having their bottom edges extending in close proximity to, and outward over, the foraminous area of the strainer so that the rotative movement of the reamer acts to scrape away or remove the pulp that is clogging the openings away from the openings sufficiently to permit the continued drainage of the juice through the strainer. This and other features of the invention will be described in the following specification and will be defined in the claims hereto annexed.

In the accompanying drawing I have illustrated an embodiment of this invention, in which Fig. 1 is a plan view of the strainer assembled for use.

Fig. 2 is a vertical section showing the juicer mounted upon a juice receiving jar or tumbler.

Fig. 3 and Fig. 4 are detail views showing, respectively, in plan and in vertical elevation a portion of the juicer having a modified arrangement of stop limiting the rotative movement for a special purpose to be described.

In the practice of the invention as illustrated in the drawing, I employ a strainer receptacle which preferably comprises a peripheral wall 1, with its upper edge rolled as shown at 1ª to form a reenforcing stiffening rim and being provided intermediate of its top and bottom with an annular shoulder as at 2ª to permit the smaller lower portion of the receptacle to be inserted in an appropriate juice container upon whose top edge or rim the annular shoulder or ledge is supported.

The bottom 3 of the strainer receptacle is foraminous and, as shown, is provided with concentric rows of perforations 3ª extending nearly to the peripheral wall of the strainer receptacle. The construction of reamer shown comprises a central approximately conical body portion 7ᶜ provided with radiating blades 7, whose bottom portions are extended out far enough to cover the outermost row of perforations and whose bottom edge lies in close proximity to, and in parallelism with, the foraminous bottom 3.

It is the intention to mount the reamer upon the central portion of the strainer receptacle so as to permit rotative movement of the reamer through a substantial arc of sufficient length to permit the bottom edges of the reamer to wipe or scrape away the pulp on the bottom of the strainer from obstructing the openings in the strainer sufficiently to permit the juice to flow freely through the strainer without the necessity of frequently emptying the strainer of pulp before operating upon additional pieces of fruit. With the usual fixed glass reamer it is usually necessary, when the oranges contain a considerable amount of pulp, to empty the pulp after juicing each orange. With a rotative reamer having scraper blades at its bottom it is quite practicable to juice a very considerable number of oranges without any interruption for the purpose of taking out the pulp.

The particular means of establishing a rotative supporting engagement between the reamer and the strainer receptacle may be varied as it is immaterial which of these two members be provided with the male and which with the female member constituting the rotative joint.

In the actual specific construction shown I have provided a centrally bored boss 5 having a circular flange at its bottom for securing it by means of screws or rivets 4 to the strainer bottom. One fastening screw 8ª may be projected up through the flange sufficiently to support and retain in operative position a stop member or pin 8 located between two adjacent reamer blades so as to limit the rotative movement in either direction, since rotation of the reamer blades 7 through a relatively small arc suffices to scrape away or clear the adjacent bottom openings of the strainer from the pulp sufficiently to allow the free flow of juice through the strainer.

In the form illustrated the dome-like body portion 7ᶜ of the reamer is provided with a threaded socket for receiving the threaded upper end 6ᵇ of a screw post 6 and preferably a bearing washer 6ª is interposed between the upper end 5ᵇ of the central boss 5 and the corresponding thrust surface near the lower end of the body portion 7ᶜ of the reamer.

While the strainer and the reamer might be made of any suitable material, I prefer to make the strainer receptacle of pressed metal, preferably of non-corrosive metal such as aluminum alloy, while the reamer may be cast of similar metal and should have its reaming blades tapered to a thin edge to more effectively and easily scrape out the pulp on the interior of the fruit being juiced.

In Fig. 3 and Fig. 4 I have shown a modification of the reamer stop member which possesses one advantage over the stop pin 8 shown in Fig. 2. In this case the stop means for limiting the rotative movement of the reamer blades 7 consists of upright bevel plates 9 provided with downwardly extending tongues 9a arranged to be inserted through perforations in the strainer bottom or fastened in any suitable manner to hold them rigidly in place between each adjacent pair of blades to limit the arc of rotation of the reamer. If stop members of this kind be used, they have the added advantage and function of permitting the pulp accumulating in the bottom of the strainer to be squeezed between the blade wings 7a and the stop plates 9 and thus an additional supply of juice may be extracted from the pulp.

What I claim is:

1. A juice extracting device comprising a receptacle having a perforated strainer bottom, a fruit reamer pivotally mounted to permit oscillation about its central axis under the torque exerted when the fruit is pressed upon the reamer and twisted to and fro, said reamer having radiating scraper blades whose lower edges extend in close proximity to the bottom to form scrapers for scraping the pulp circumferentially in opposite directions, and stop means interposed between the scraper blades to limit oscillatory movements of the reamer and serve as abutments against which the scraper blades squeeze the extracted pulp while uncovering a portion of the perforations.

2. A juice extracting device comprising a receptacle having a foraminous strainer bottom and a central bearing member, a fruit reamer pivotally mounted for free oscillation within a positively limited arc in response to the torque exerted by pressure upon it of a fruit section being twisted to and fro, scraper blades radiating from the lower portion of the reamer in close proximity to the strainer bottom and acting to scrape the pulp away from underlying strainer openings on each oscillation of the reamer, a fixed stop member arranged to hold the reamer stationary, after a narrow arc of movement, against the torque exerted by the further twisting of the fruit in the same direction, whereby the strainer openings are uncovered to permit drainage of the juice by the oscillating movement of the strainer and the reamer acts to ream the fruit during the further twisting of the fruit thereon.

MICHAEL A. KENNEDY.